(12) United States Patent
Klein et al.

(10) Patent No.: US 9,164,935 B2
(45) Date of Patent: Oct. 20, 2015

(54) DETERMINING WHEN TO THROTTLE INTERRUPTS TO LIMIT INTERRUPT PROCESSING TO AN INTERRUPT PROCESSING TIME PERIOD

(71) Applicant: International Business Machines Corporation, Armonk, NY (US)

(72) Inventors: Steven E. Klein, Tucson, AZ (US); Timothy J. Van Patten, Tucson, AZ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 248 days.

(21) Appl. No.: 13/734,770

(22) Filed: Jan. 4, 2013

(65) Prior Publication Data

US 2014/0195708 A1 Jul. 10, 2014

(51) Int. Cl.
G06F 13/24 (2006.01)
G06F 9/48 (2006.01)

(52) U.S. Cl.
CPC .............. *G06F 13/24* (2013.01); *G06F 9/4812* (2013.01); *G06F 2213/2404* (2013.01); *G06F 2213/2406* (2013.01); *G06F 2213/2408* (2013.01)

(58) Field of Classification Search
CPC ............................................ G06F 13/24–13/26
USPC ......................................................... 710/263
See application file for complete search history.

(56) References Cited

U.S. PATENT DOCUMENTS

| 5,943,479 | A | * | 8/1999 | Klein et al. ................... 709/212 |
| 6,065,089 | A | * | 5/2000 | Hickerson et al. ............ 710/266 |
| 6,189,066 | B1 | * | 2/2001 | Lowe et al. ................... 710/260 |
| 6,192,440 | B1 | * | 2/2001 | Lowe et al. ................... 710/260 |
| 6,351,785 | B1 | * | 2/2002 | Chen et al. ................... 710/263 |
| 6,633,941 | B2 | * | 10/2003 | Dunlap et al. ................ 710/262 |
| 6,760,799 | B1 | * | 7/2004 | Dunlap et al. ................ 710/260 |
| 6,792,492 | B1 | * | 9/2004 | Griffin ......................... 710/262 |
| 6,880,021 | B2 | * | 4/2005 | Easton et al. ..................... 710/5 |

(Continued)

OTHER PUBLICATIONS

S. Otani, et al., "An 80 Gbps Dependable Multicore Communication SoC with PCI Express I/F and Intelligent Interrupt Controller", IEEE COOL Chips XIV, Apr. 2011, pp. 1-3.

(Continued)

*Primary Examiner* — Ryan Stiglic
(74) *Attorney, Agent, or Firm* — David W. Victor; Konrad Raynes Davda & Victor LLP (57) ABSTRACT

Provided are a computer program product, system, and method for determining when to throttle interrupts to limit interrupt processing to an interrupt processing time. Upon receiving interrupts from the hardware device, a determination is made as to whether a number of received interrupts exceeds an interrupt threshold during a interrupt tracking time period. If so, an interrupt throttling state is set to a first value indicating to only process interrupts during an interrupt processing time period. Interrupts from the hardware device are processed during the interrupt time period when the interrupt throttling state is set to the first value. Interrupts received from the hardware are masked during a processing of a scan loop of operations while the interrupt throttling has the first value and the interrupt processing time period has expired, wherein the masked interrupts are not processed while processing the scan loop of operations.

24 Claims, 5 Drawing Sheets

(56) References Cited

U.S. PATENT DOCUMENTS

| | | | |
|---|---|---|---|
| 7,054,972 B2* | 5/2006 | Parry et al. | 710/260 |
| 7,120,717 B2* | 10/2006 | Vu | 710/262 |
| 7,191,258 B2* | 3/2007 | Jeong | 710/22 |
| 7,275,122 B2* | 9/2007 | Wright et al. | 710/260 |
| 7,350,007 B2* | 3/2008 | Depew et al. | 710/267 |
| 7,444,450 B2* | 10/2008 | Wright et al. | 710/264 |
| 7,478,186 B1* | 1/2009 | Onufryk et al. | 710/263 |
| 7,617,389 B2* | 11/2009 | Nikami et al. | 712/244 |
| 7,788,435 B2* | 8/2010 | Worthington et al. | 710/263 |
| 7,917,677 B2* | 3/2011 | Johnson et al. | 710/260 |
| 7,962,679 B2* | 6/2011 | van de Ven | 710/261 |
| 8,234,431 B2* | 7/2012 | Kruglick | 710/262 |
| 8,386,683 B2* | 2/2013 | Hiroki | 710/262 |
| 8,463,971 B2* | 6/2013 | Solomita et al. | 710/267 |
| 8,478,923 B2* | 7/2013 | Dasari et al. | 710/266 |
| 8,478,924 B2* | 7/2013 | Ahmad et al. | 710/267 |
| 8,510,491 B1* | 8/2013 | Hendel et al. | 710/260 |
| 8,566,494 B2* | 10/2013 | Li et al. | 710/263 |
| 2004/0117534 A1* | 6/2004 | Parry et al. | 710/260 |
| 2005/0182879 A1* | 8/2005 | Vu | 710/260 |
| 2005/0246465 A1* | 11/2005 | Wright et al. | 710/260 |
| 2005/0246466 A1* | 11/2005 | Wright et al. | 710/260 |
| 2006/0224808 A1* | 10/2006 | Depew et al. | 710/267 |
| 2007/0043970 A1* | 2/2007 | Solomita et al. | 714/10 |
| 2008/0147905 A1* | 6/2008 | Shi et al. | 710/22 |
| 2008/0155154 A1* | 6/2008 | Kenan et al. | 710/263 |
| 2009/0089470 A1* | 4/2009 | van de Ven | 710/260 |
| 2009/0177829 A1* | 7/2009 | Worthington et al. | 710/267 |
| 2010/0030939 A1 | 2/2010 | Litovtchenko et al. | |
| 2010/0070669 A1* | 3/2010 | Johnson et al. | 710/264 |
| 2010/0153590 A1* | 6/2010 | Hsin et al. | 710/22 |
| 2010/0274938 A1* | 10/2010 | Anand et al. | 710/263 |
| 2010/0274940 A1* | 10/2010 | Ahmad et al. | 710/267 |
| 2011/0016246 A1* | 1/2011 | Hiroki | 710/262 |
| 2011/0087815 A1* | 4/2011 | Kruglick | 710/260 |
| 2011/0145462 A1 | 6/2011 | Mukherjee et al. | |
| 2011/0320664 A1 | 12/2011 | Belmar et al. | |
| 2012/0137029 A9* | 5/2012 | Hsin et al. | 710/22 |
| 2012/0254492 A1* | 10/2012 | Li et al. | 710/269 |

OTHER PUBLICATIONS

"Method to Control Interrupt Coalescing Through Software Under Varying Network Load", IP.com Prior Art Database, IP.com No. IPCOM000215419D, Feb. 2012, pp. 1-5.

* cited by examiner

Processor - DMA Engine Assignment

FIG. 3

Processor - Port Assignment

DETERMINING WHEN TO THROTTLE INTERRUPTS TO LIMIT INTERRUPT PROCESSING TO AN INTERRUPT PROCESSING TIME PERIOD

BACKGROUND OF THE INVENTION

1. Field of the Invention

The present invention relates to a computer program product, system, and method for determining when to throttle interrupts to limit interrupt processing to an interrupt processing time period.

2. Description of the Related Art

In a dual cluster system, each cluster includes a processing complex and cache. Each cluster is assigned a plurality of volumes, where volumes may be grouped in Logical Subsystems (LSSs). Data being written to a volume may be stored in the cache of the cluster to which the data is assigned. Multiple clusters may receive I/O requests from hosts over a network via a shared network adaptor in the storage controller including the dual clusters.

The shared network adaptor may include a plurality of ports on which I/O requests are received, a plurality of DMA engines to transfer data between the clusters and the ports on which the I/O requests are received, and a plurality of processors (or cores on a single central processing unit) to process I/O requests and control the DMA engines to transfer data for the I/O requests. A processor may be assigned or have affinity for particular ports, so only one processor processes the I/O requests for a port and returns complete or data to the assigned port on which the I/O request was initiated. The DMA engines may have affinity or be assigned to particular logical subsystems (LSSs) or volumes, such that the LSS or volume including the target data of the I/O request is used to determine the DMA engine in the adaptor to use to handle the data transfer to or from the clusters.

The DMA engines in the network adaptor have the ability to detect errors in data being transferred and may signal a processor in the network adaptor, such as a System on a Chip (SOC), of the error by generating an interrupt. In a Symmetric Multiprocessing (SMP) environment, there may be a "master" processor that performs special event handling, such as initializing system hardware and handling system interrupts. If the DMA engines generate numerous error interrupts, a situation may occur where the master processor is processing so many interrupts that it is not able to perform its normal I/O processing operations unrelated to interrupts. If the master processor is involved in handling numerous interrupts, than it may not be able to respond to other of the processors and may appear as in an error state, requiring error recovery. Error recovery is undesirable because it may cause a performance drop while the error recovery is occurring.

Dynamic interrupt coalescing, implemented in Network Interface Cards (NICs) hardware, addresses the problem of interrupt handling overload by coalescing multiple interrupts without signaling the processor. This allows the processor to process several packets before being signaled with an interrupt to process the coalesced interrupts. Coalescing interrupts allows the processor to make progress through its normal, non-interrupt, code path.

SUMMARY

Provided are a computer program product, system, and method for determining when to throttle interrupts to limit interrupt processing to an interrupt processing time. Upon receiving interrupts from the hardware device, a determination is made as to whether a number of received interrupts exceeds an interrupt threshold during a interrupt tracking time period. If so, an interrupt throttling state is set to a first value indicating to only process interrupts during an interrupt processing time period. Interrupts from the hardware device are processed during the interrupt time period when the interrupt throttling state is set to the first value. Interrupts received from the hardware are masked during a processing of a scan loop of operations while the interrupt throttling has the first value and the interrupt processing time period has expired, wherein the masked interrupts are not processed while processing the scan loop of operations.

DETAILED DESCRIPTION

Described embodiments provide techniques to throttle interrupts to allow normal processing operations to proceed without being delayed by interrupts. If a number of interrupts within an interrupt tracking time period exceeds a threshold, then interrupt throttling is set so that interrupts are only processed within an interrupt processing time period. Outside of the interrupt processing time period, throttled interrupts are masked so that the processor may continue normal operations without interference from interrupts. Further, with described embodiments, one processor may be dedicated to handling interrupts and when in the interrupt throttling states, ports assigned to the interrupt handling processor may be assigned to another processor that does not handle interrupts.

Figure 1:
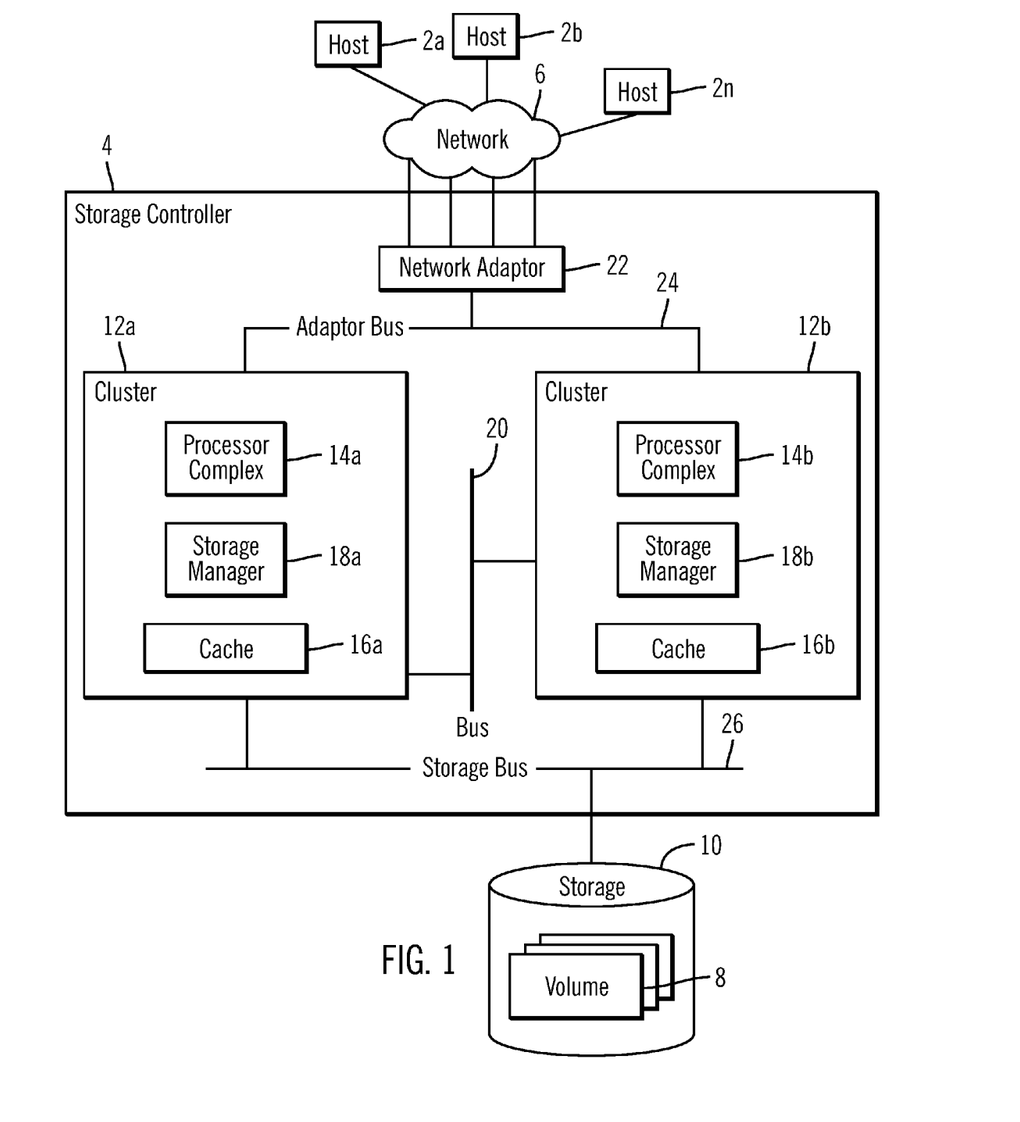
FIG. 1 illustrates an embodiment of a storage computing environment.

FIG. 1 illustrates an embodiment of a computing environment. A plurality of hosts 2a, 2b . . . 2n may submit Input/Output (I/O) requests to a storage controller 4 over a network 6 to access data at volumes 8 (e.g., Logical Unit Numbers, Logical Devices, Logical Subsystems, etc.) in a storage 10. The storage controller 4 may include at least two clusters 12a, 12b. In an alternative embodiment, the storage controller 4 may only include one cluster. Each cluster 12a, 12b includes a processor complex 14a, 14b including one or more processors with single or multiple cores, a cache 16a, 16b for caching data transferred between the hosts 2a, 2b . . . 2n and the storage 10, and a storage manager 18a, 18b for managing the transfer of data transferred between the hosts 2a, 2b . . . 2n and the storage 10. The storage managers 18a, 18b may also maintain an assignment of volumes 8 to clusters 12a, 12b owning a volume or group of volumes in the attached storage 8, such that an owner cluster 12a, 12b handles the writes to those volumes 8 that cluster owns by caching the write data and executing the write against the volume.

The clusters 12a, 12b receive I/O requests from the hosts 2a, 2b . . . 2n and buffer the requests and write tracks in their respective cache 16a, 16b. A track may comprise any unit of data configured in the storage 10, such as a track, Logical Block Address (LBA), etc., which is part of a larger grouping of tracks, such as a volume, logical device, etc.

The storage manager 18a, 18b may comprise one or more programs loaded into a memory that are executed by the processor complex 14a, 14b or may be implemented in hardware devices in the clusters 12a, 12b, such as in Application Specific Integrated Circuits (ASIC). In one embodiment, the caches 16a, 16b may comprise a volatile storage.

A communication bus 20 provides a communication interface to enable communication between the clusters 12a, 12b, and may utilize communication interface technology known in the art, such as Peripheral Component Interconnect (PCI) bus or other bus interfaces, or a network communication interface. Further, the bus 20 may comprise a processor Symmetrical Multi-Processor (SMP) fabric comprising busses, ports, logic, arbiter, queues, etc. to enable communication among the cores and components in the processor complexes 10a, 10b The clusters 12a, 12b communicate with the network 6 via one or more shared network adaptors 22 that provide separate connection lines to the network 6. The adaptor 22 is in communication with both clusters 12a, 12b over an adaptor bus 24. The clusters 12a, 12b are both capable of accessing volumes 8 in the storage 10 over a shared storage bus 26. The busses 24 and 26 may utilize a suitable storage communication interface known in the art, such as the PCI interface.

In one embodiment, the clusters 12a, 12b in the storage controller 4 may comprise separate processing systems, and may be on different power boundaries and implemented in separate hardware components, such as each cluster implemented on a separate motherboard. In an alternative embodiment, the clusters 12a, 12b may comprise virtual or logical devices having logical components implemented on a shared hardware platform.

The storage 10 may comprise an array of storage devices, such as a Just a Bunch of Disks (JBOD), Direct Access Storage Device (DASD), Redundant Array of Independent Disks (RAID) array, virtualization device, tape storage, flash memory, solid state storage devices (e.g., EEPROM (Electrically Erasable Programmable Read-Only Memory), flash memory, storage-class memory (SCM)), electronic memory, magnetic tape media, etc.

The network 6 may comprise a Storage Area Network (SAN), a Local Area Network (LAN), a Wide Area Network (WAN), the Internet, and Intranet, etc.

Figure 2:
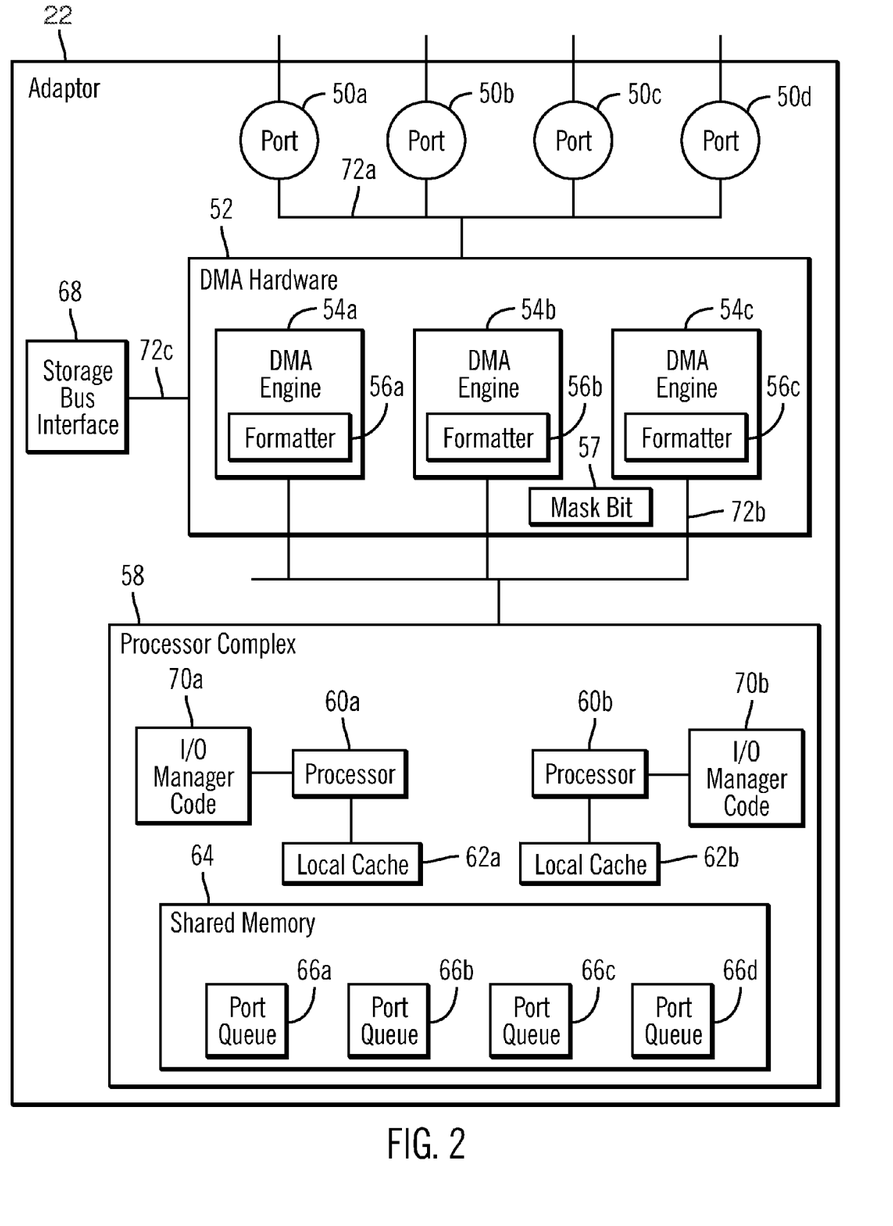
FIG. 2 illustrates an embodiment of an adaptor.

FIG. 2 illustrates an embodiment of the network adaptor 22. The network adaptor 22 includes a plurality of ports 50a, 50b, 50c, 50d that provide separate physical connections to the network 6, where a separate network cable may connect to each port 50a, 50b, 50c, 50d. Hosts 2a, 2b, 2c, 2d may communicate I/O requests to the clusters 12a, 12b via paths configured through the ports 50a, 50b, 50c, 50d. In an alternative embodiment, the ports 50a, 50b, 50c, 50d may comprise logical ports representing physical connections to the network 6. Direct Memory Access (DMA) hardware 52 has a plurality of DMA engines 54a, 54b, 54c. The DMA hardware 52 may comprise an Application Specific Integrated Circuit (ASIC) on which the DMA engines 54a, 54b, 54c are implemented. Alternatively, the DMA engines 54a, 54b, 54c may be implemented on multiple ASICs. The hardware 52 may further include one or more mask bits 57 indicating whether interrupts from the DMA engines 54a, 54b, 54c are to be masked. When interrupts for a DMA engine 54a, 54b, 54c are masked, then that DMA engine 54a, 54b, 54c may continue asserting the masked interrupt without performing further operations or generating further interrupts until the masked interrupt is handled. There may be one mask bit 57 to mask interrupts at all the DMA engines 54a, 54b, 54c or there may be a separate mask bit 57 for each DMA engine 54a, 54b, 54c, such that interrupts may be masked at some DMA engines, but not others.

The processors 60a, 60b may set the mask bit 57 in the DMA hardware 52 to cause interrupts to be masked at the DMA engines 54a, 54b, 54c.

A processor complex 58 includes a plurality of processors 60a, 60b, each having a local cache 62a, 62b, such as an on-board L1 cache. The processors 60a, 60b may access a shared memory 64, such as an L2 cache, having a plurality of port queues 66a, 66b, 66c, 66d, one for each port 50a, 50b, 50c, 5d, respectively. The port queues 66a, 66b, 66c, 66d queue I/O completes taken from the DMA engine completion queues 56a, 56b, 56c by the processors 60a, 60b to process in the queue order. The queues 66a, 66b, 66c, 66d may comprise First-in-First-Out (FIFO) queues. The processors 60a, 60b communicate with the ports 50a, 50b, 50c, 50d and the clusters 12a, 12b via the DMA hardware 52 The processors 60a, 60b may comprise separate cores on a single Central Processing Unit (CPU) or comprise separate CPUs. Each processor 60a, 60b is associated with I/O manager code 70a, 70b, respectively, that the processors 60a, 60b execute to perform I/O request management operations in the adaptor 22. In one embodiment, the I/O manager code 70a, 70b may be implemented in a non-volatile memory or storage device, such as a Read Only Memory (ROM), solid state storage device, non-volatile random access memory (NVRAM), etc.

Each of the DMA engines 54a, 54b, 54c may include formatter hardware 56a, 56b, 56c. The DMA engine formatter 56a, 56b, 56c adds metadata to Input/Output (I/O) requests, appends error correction codes if sending the packets to the processors 60a, 60b and strips metadata from the packets if sending the I/O requests to attached hosts. If the DMA engine formatter 56a, 56b, 56c detects that data to be returned to a host is corrupted, it may generate an interrupt to one of the processors 60a, 60b to handle and perform recovery with respect to the error. One of the processors 60a, 60b may be designated to handle interrupts, e.g., a master processor or interrupt handling processor. The DMA engine formatter 56a, 56b, 56c may send the interrupt to the interrupt handling processor 60a, 60b so that the processor may handle the error and return the formatter to normal operations.

A storage bus interface 68 provides the interface from the adaptor 22 components to the adaptor bus 24. Bus 72a provides a communication interface between the ports 50a, 50b, 50c, 50d and the DMA hardware 52a, including DMA engines 54a, 54b, 54c, bus 72b provides communication between the DMA engines 54a, 54b, 54c and the processors 60a, 60b, and bus 72c connects the DMA hardware 52 and DMA engines 54a, 54b, 54c to the storage bus interface 68. The busses 72a, 72b, and 72c may use suitable bus interface technology known in the art, such as PCI. Further the busses 72a, 72b, 72c may be implemented as fewer or more busses than shown.

The DMA engines 54a, 54b, 54c may provide for the transfer of data between the ports 50a, 50b, 50c, 50d and the clusters 12a, 12b independently of the processors 60a, 60b. The adaptor 22 may include a memory in which the DMA engines 54a, 54b, 54c buffer requested read data received from the clusters 12a, 12b or buffer write data for write requests pending transfer to the clusters 12a, 12b. The DMA engines 54a, 54b, 54c and processors 60a, 60b use port queues 66a, 66b, 66c, 66d to queue information on I/O requests being processed to manage the processing of I/O requests for reads and writes sent to the adaptor 22 from the initiating host 2a, 2b . . . 2n.

FIG. 2 shows a certain number of instances of elements, such as ports 50a, 50b, 50c, 50d, DMA engines 54a, 54b, 54c, processors 60a, 60b, and queues. In further embodiments there may be a different number of these elements in different adaptor 22 implementations, such as more or fewer ports and DMA engines, more processors, etc.

Figure 3:
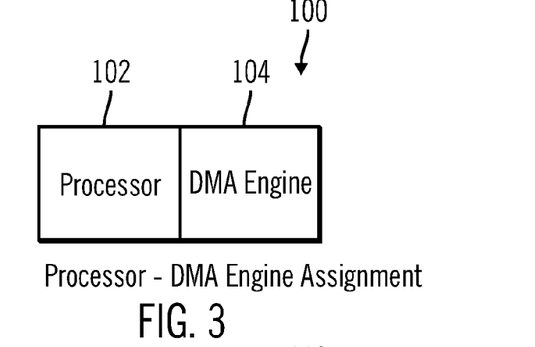
FIG. 3 illustrates an embodiment of a processor-DMA engine assignment.
Figure 4:
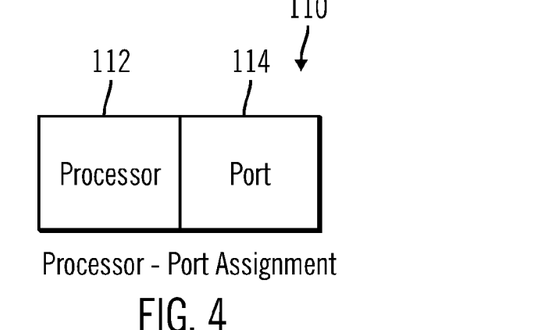
FIG. 4 illustrates an embodiment of a processor-port assignment.
Figure 5:
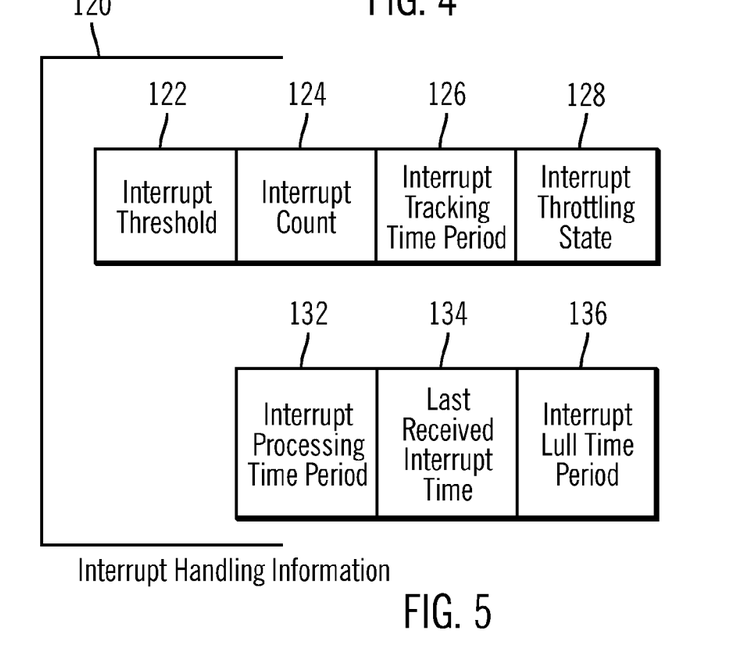
FIG. 5 illustrates an embodiment of interrupt handling information.

FIGS. 3-5 illustrate information maintained in the adaptor 22 to manage the processing of I/O requests. FIG. 3 illustrates an instance of a processor-DMA engine assignment 100 indicating a processor 102 assigned to a DMA engine 104, such that the assigned processor may only process I/O completes for the assigned DMA engine 104. The assignment may express an affinity of a DMA engine for a processor. Further, a processor 60a, 60b may select the assigned DMA engine 104 to process I/O requests received at the ports 50a, 50b, 50c, 50d. The processor-DMA engine assignment 100 may be maintained in the processor local cache 62a, 62b of the processor 60a, 60b to which the assignment relates, or some other location in the adaptor 22.

FIG. 4 illustrates an instance of a processor-port assignment 110 indicating a processor 112 assigned to a port 114, such that the assigned processor 112 only processes I/O requests received at the assigned port 114. In certain embodiments, the ports 50a, 50b, 50c, 50d may be divided evenly among the available processors 60a, 60b. The processor-port assignment 110 may be maintained in the processor local cache 62a, 62b of the processor 60a, 60b to which the assignment relates.

With the processor-DMA engine assignment 100 and processor-port assignment 110, I/O requests received at a port 50a, 50b, 50c, 50d are processed by the same assigned processor 60a, 60b and DMA engine 54a, 54b, 54c.

FIG. 5 illustrates an embodiment of interrupt handling information 120 used by the interrupt handling processor, e.g., 60a, to manage interrupts and processing of non-interrupt related tasks, such as I/O requests from the hosts 2a, 2b, 2c. The interrupts processed may comprise error interrupts sent by the DMA engine formatter 56a, 56b, 56c to signal an error in the I/O requests being processed. The interrupt handling information 120 may be maintained in the local cache 62a of the interrupt handling processor 60a. The processor that is not designated to handle interrupts, e.g., the non-interrupt handling processor, e.g., 62b, may be dedicated to performing non-interrupt related operations, such as processing I/O requests in the adaptor 22.

The interrupt handling information 120 may include an interrupt threshold 122. When an interrupt count 124, comprising a number of interrupts counted during an interrupt tracking time period 126, exceeds the interrupt threshold 122, then an interrupt throttling state 128 may be set to indicate throttle. A setting of throttle, such as to a first value, indicates that interrupts are to only be processed during an interrupt processing time period 132 and the non-throttle value, such as a second value different from the first value, indicates that interrupts may be processed when received. When the interrupt throttling state 128 is set to non-throttle, or no throttling, interrupts are immediately processed by the interrupt handling processor 60a. When the interrupt throttling state is set to the throttle value, interrupts are only periodically processed during an interrupt processing time period 132. After the interrupt processing time period 132 expires, interrupts are masked and not processed by the interrupt handling processor 60a in order to allow the interrupt handling processor 60a to perform other operations, such as process adaptor 22 I/O requests, without being interrupted by interrupts.

The interrupt handling information 120 further indicates a last received interrupt time 134 comprising a time the most recent interrupt was received. If an interrupt has not been received within an interrupt lull time period 136, e.g., the elapsed time since the last received interrupt time 134, then the interrupt throttling state 128 is set to indicate that interrupts are not to be masked. Certain of the interrupt handling information 120 comprises predetermined values, set by an administrator or as default, including the interrupt threshold 122, interrupt tracking time period 126, interrupt processing time period 132, and interrupt lull time period 136. Other of the interrupt handling information 120 comprises information set during operations, such as the interrupt count 1214, interrupt throttling state 128, and last received interrupt time 134.

Figure 6:
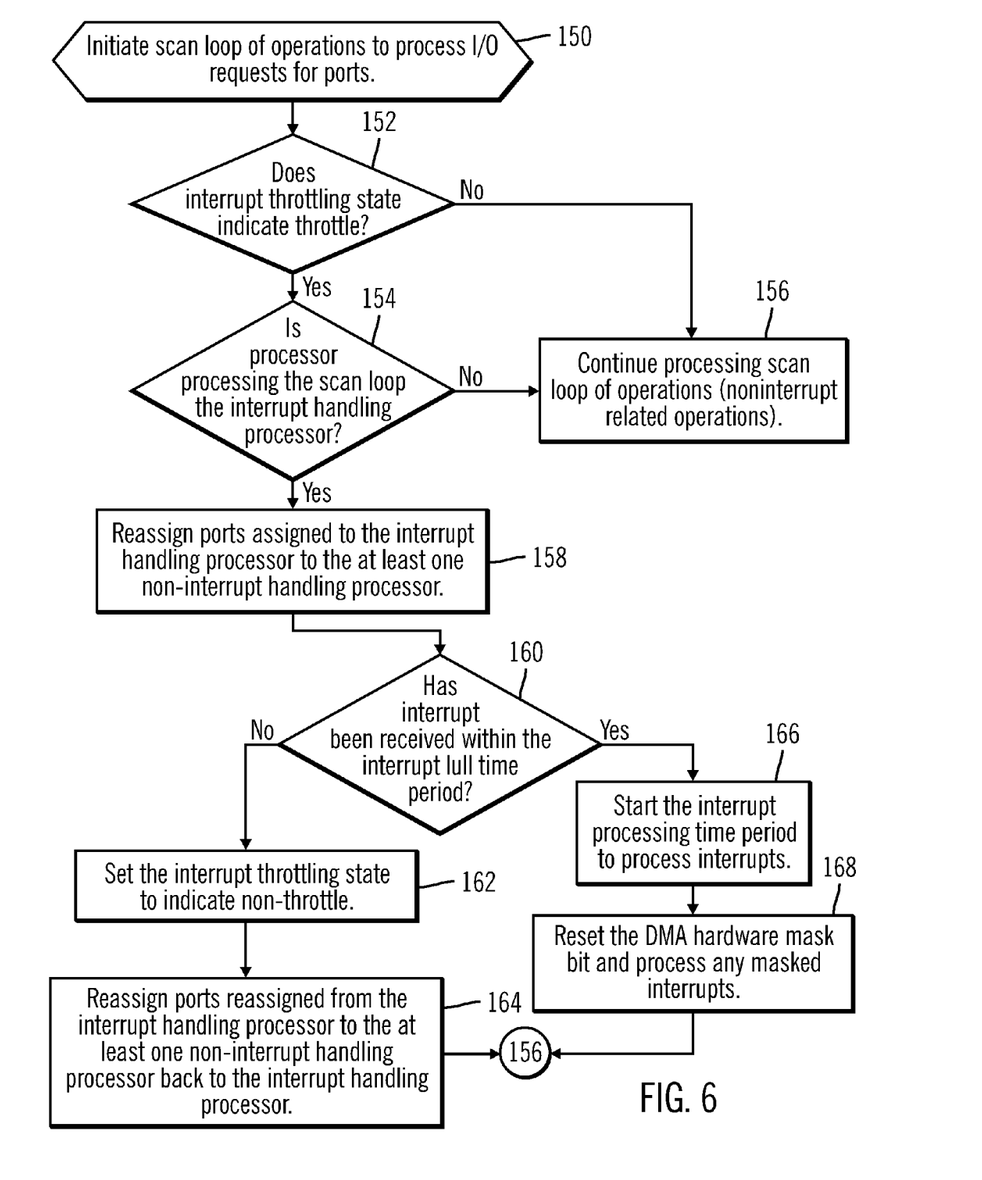
FIG. 6 illustrates an embodiment of operations to perform a scan loop of operations.

FIG. 6 illustrates an embodiment of operations performed by one of the processors 60a, 60b to perform a scan loop of operations. Upon initiating (at block 150) a scan loop of operations, if (at block 152) the interrupt throttling state 128 indicates non-throttle, no throttling, then the processor 60a, 60b continues processing (at block 156) the scan loop of operations, such as non-interrupt related operations concerning the processing of I/O requests at the network adaptor 22, as well as interrupts. If (at block 152) the interrupt throttling state 128 indicates to throttle but the processor 60a, 60b processing the scan loop does not handle interrupts, then control also proceeds to block 156 to continue with non-interrupt scan loop operations. However, if (at block 152) the interrupt throttling state 128 indicates to throttle processing of interrupts by the interrupt handling processor, e.g., 60a, then the ports 50a, 50b, 50c, 50d assigned to the interrupt handling processor 60a are reassigned (at block 158) to one or more non-interrupt handling processors so that the non-interrupt handling processors would handle I/O requests directed to ports 50a, 50b, 50c, 50d previously assigned to the interrupt handling processor 60a.

If (at block 160) an interrupt has not been received within the interrupt lull time period 136, e.g., the interval from the last received interrupt time 134 to a current time is less than the interrupt lull time period 136, then the interrupt handling processor 60a sets (at block 162) the interrupt throttling state 128 to indicate that interrupts are not to be throttled and reassigns (at block 164) ports to the interrupt handling processor 60a, such as ports previously assigned from the interrupt handling processor 60a to a non-interrupt handling processor 60b. If (at block 160) an interrupt has been received within the interrupt lull time period 136, then the interrupt processing time period 132 is restarted (at block 166) and the interrupt handling processor 60a clears the mask bit 57 in the DMA hardware 52 and processes any pending interrupts at the DMA engines 54a, 54b, 54c. As discussed, the mask bit 57 may mask interrupts for all DMA engines or there may be a mask bit 57 for each engine. From block 164 or 168, control proceeds to block 156 to continue processing non-interrupt handling scan loop operations, such as sending a heartbeat signal to other processors 60b to indicate operational state and I/O requests for the adaptor 22.

Figure 7:
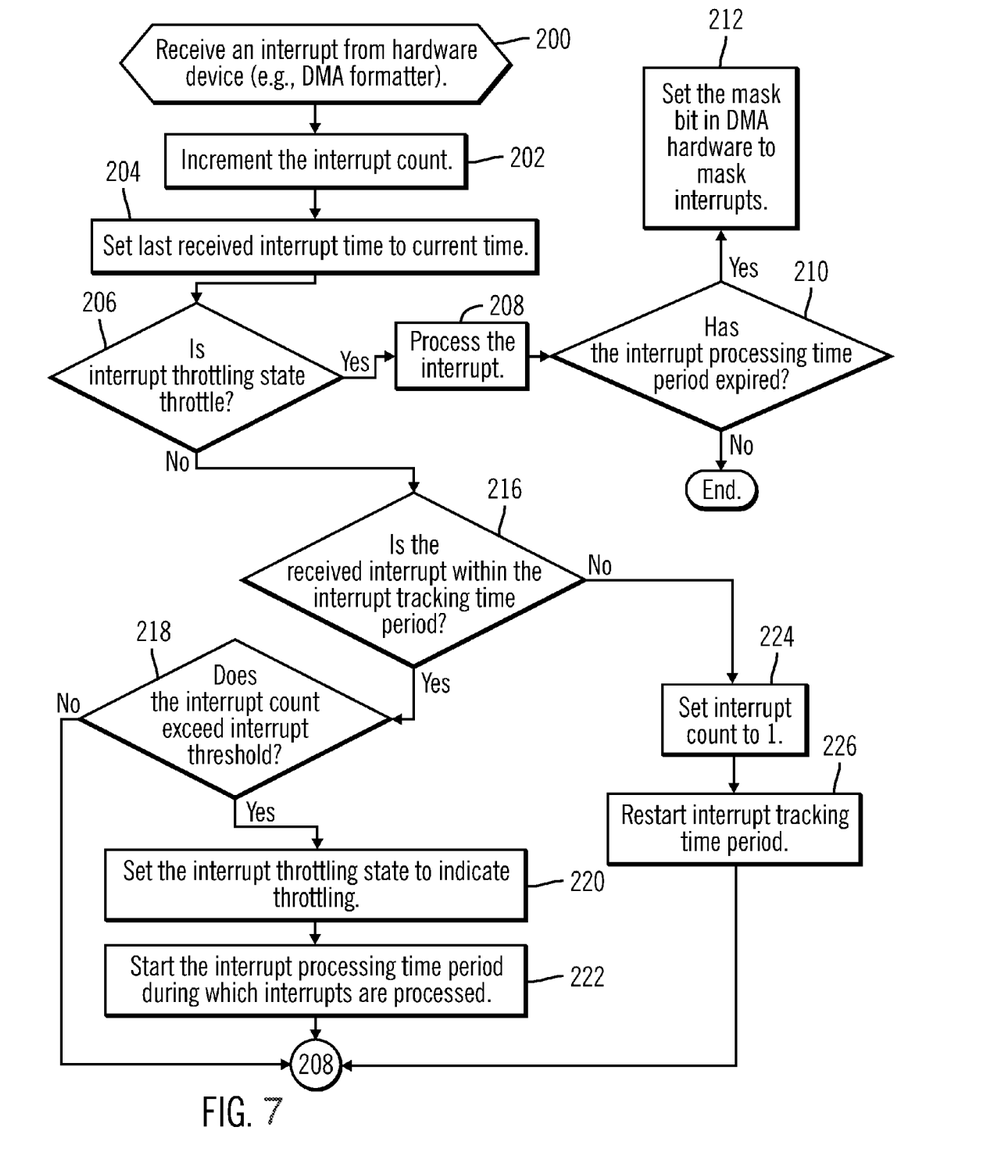
FIG. 7 illustrates an embodiment of operations to process an interrupt.

FIG. 7 illustrates an embodiment of operations performed by the interrupt handling processor, e.g., 60a, to process an interrupt received from the hardware 52, such as an error interrupt generated by the DMA formatter 56a. Upon receiving (at block 200) the interrupt, the interrupt count 124 is incremented (at block 202) and the last received interrupt time 134 is set (at block 204) to a current time. If (at block 206) the interrupt throttling state 128 indicates to throttle interrupts, then the interrupt is processed (at block 208). If (at block 210) the interrupt processing time period 132 has not expired, then control ends. If (at block 210) the time for processing interrupts has expired, i.e., the interrupt processing time period 132 has expired, then the interrupt handling processor 60a sets (at block 212) the mask bit 57 in the DMA hardware 52 to cause the DMA hardware 52 to mask interrupts at one or more of the DMA engines 56a, 56b,m 56c. After masking interrupts (at block 212), control ends and interrupts are unmasked at the DMA hardware 52 until the scan loop is processed. Interrupts will be unmasked in the scan loop, after one iteration of the scan loop has been completed (at block 168 in FIG. 6), to allow the interrupt handling processor 60a to update any heartbeat timers and perform any other necessary work.

If (at block 206) the interrupt throttling state 128 indicates non-throttling, then the interrupt handling processor 60a determines (at block 216) whether the received interrupt has been received within the interrupt tracking time period 126. If so, then a determination is made (at block 218) as to whether the interrupt count 124 exceeds the interrupt threshold 122, meaning a threshold number of interrupts have been received within the interrupt tracking time period 126, indicating a high level of continuously received interrupts. In such case, the interrupt throttling state 128 is set (at block 220) to indicate throttle. The interrupt processing time period 132 may then be started (at block 222) to process the interrupts for that time period 132. If (at block 216) the received interrupt is not within the interrupt tracking time period 126, then the interrupt count 124 is reset (at block 224) to one and the interrupt tracking time period 126 is restarted (at block 226). From blocks 222 or 226, control proceeds to block 208 to process the interrupt when the interrupt processing time period 132 is active.

With the described embodiments, when the interrupt throttling state 128 is set to throttle, interrupts are not masked while the interrupt processing time period 132 has not expired but masked at the DMA hardware after the interrupt processing time period 132 has expired. This ensures that during throttling interrupts are allowed to be processed during the interrupt processing time period 132, but not outside of this time period when the scan loop operations process non-interrupt related tasks, such as processing I/O requests in the network adaptor 22. During the interrupt processing time period 132, non-interrupt handling operations may be delayed. However, after the interrupt processing time period 132 expires, the scan loop operation may continue to proceed without being delayed by interrupts because the interrupt throttling state 128 indicates that interrupts are to be masked at the hardware.

The described operations may be implemented as a method, apparatus or computer program product using standard programming and/or engineering techniques to produce software, firmware, hardware, or any combination thereof. Accordingly, aspects of the embodiments may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the embodiments may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A computer program product for managing interrupts from a hardware device, the computer program product comprising a non-transitory computer readable storage medium having computer readable program code embodied therein that is executed to perform operations in the network adaptor, the operations comprising:
   receiving interrupts from the hardware device;
   determining whether a number of received interrupts exceeds an interrupt threshold during an interrupt tracking time period;
   setting an interrupt throttling state to a first value indicating to only process interrupts during an interrupt processing time period in response to determining that the number of received interrupts exceeds an interrupt threshold;
   processing interrupts from the hardware device during the interrupt processing time period when the interrupt throttling state is set to the first value; and
   masking interrupts received from the hardware device during a processing of a scan loop of operations while the interrupt throttling state has the first value and the interrupt processing time period has expired, wherein the masked interrupts are not processed while processing the scan loop of operations, and wherein further interrupts are not generated until the masked interrupts are handled.

2. The computer program product of claim 1, wherein the computer program product is executed by a processor in a network adaptor having a plurality of ports, wherein the hardware device comprises at least one DMA engine to process I/O requests for the ports and wherein the interrupts comprise error interrupts detected by DMA engine.

3. The computer program product of claim 1, wherein the operations of receiving the interrupts, determining whether the number of interrupts exceeds the interrupt threshold, setting the interrupt throttling state, processing the interrupts during the interrupt processing time period, processing the scan loop of operations, and masking the interrupts are performed by an interrupt handling processor, wherein the scan loop of operations are performed by the interrupt handling processor and at least one non-interrupt handling processor, and wherein the at least one non-interrupt handling processor processes scan loop operations without handling interrupts from the hardware device.

4. The computer program product of claim 3, wherein the operations further comprise:
   reassigning ports assigned to the interrupt handling processor to the at least one non-interrupt handling processor in response to setting the interrupt throttling state to the first value.

5. The computer program product of claim 4, wherein the operations further comprise:
   reassigning ports reassigned from the interrupt handling processor to the at least one non-interrupt handling processor back to the interrupt handling processor in response to determining that an interrupt has not been received for an interrupt lapse time period.

6. The computer program product of claim 3, wherein the processors further perform operations comprising:
   processing the scan loop of operations; and
   in response to processing the scan loop of operations, performing:
      determining whether the interrupt throttling state comprises the first value or a second value;
      determining whether the processor processing the scan loop of operations comprises the interrupt handling processor;
      processing interrupts when processing the scan loop of operations in response to determining that the interrupt throttling state has a second value and that the processor processing the scan loop of operations comprises the interrupt handling processor; and
      processing the scan loop of operations without processing interrupts in response to determining that the interrupt throttling state has the second value or that the processor processing the scan loop of operations comprises one of the non-interrupt handling processors.

7. The computer program product of claim 3, wherein during the processing of the scan loop of operations signaling the at least one non-interrupt handling processor that the interrupt handling processor is active.

8. The computer program product of claim 1, wherein the operations further comprise:
   determining that an interrupt has not been received for an interrupt lull time period;
   setting the interrupt throttling state to a second value in response to determining that the interrupt has not been received for the interrupt lull time period; and
   processing interrupts received from the hardware device when processing the scan loop when the interrupt throttling state indicates the second value.

9. The computer program product of claim 8, wherein the operations of determining that the interrupt has not been received for the interrupt lull time period and setting the interrupt throttling state to the second value are performed when processing the scan loop of operations.

10. The computer program product of claim 1, wherein the operations during the scan loop comprise:
    determining whether the interrupt throttling state indicates the first value, wherein interrupts are processed from the hardware device during the interrupt processing time period in response to determining that the interrupt throttling state indicates the first value, and wherein the determination of whether the number of received interrupts exceeds the interrupt threshold is performed in response to determining that the interrupt throttling state indicates a second value; and
    restarting the interrupt tracking time period in response to determining that the interrupt is received after the interrupt tracking time period has expired.

11. A system for managing interrupts from a hardware device, comprising:
    a processor executing code to perform operations, the operations comprising:
    receiving interrupts from the hardware device; determining whether a number of received interrupts exceeds an interrupt threshold during an interrupt tracking time period;
    setting an interrupt throttling state to a first value indicating to only process interrupts during an interrupt processing time period in response to determining that the number of received interrupts exceeds an interrupt threshold;
    processing interrupts from the hardware device during the interrupt processing time period when the interrupt throttling state is set to the first value; and
    masking interrupts received from the hardware device during a processing of a scan loop of operations while the interrupt throttling state has the first value and the interrupt processing time period has expired, wherein the masked interrupts are not processed while processing the scan loop of operations, and wherein further interrupts are not generated until the masked interrupts are handled.

12. The system of claim 11, further comprising:
    a network adaptor having a plurality of ports, wherein the processor is in the network adaptor, and wherein the hardware device comprises at least one DMA engine to process I/O requests for the ports and wherein the interrupts comprise error interrupts detected by DMA engine.

13. The system of claim 11, wherein the processor comprises an interrupt handling processor performing the operations of receiving the interrupts, determining whether the number of interrupts exceeds the interrupt threshold, setting the interrupt throttling state, processing the interrupts during the interrupt processing time period, processing the scan loop of operations, and masking the interrupts, further comprising:
    at least one non-interrupt handling processor, wherein the scan loop of operations are performed by the interrupt handling processor and the at least one non-interrupt handling processor, and wherein the at least one non-interrupt handling processor processes scan loop operations without handling interrupts from the hardware device.

14. The system of claim 13, wherein the operations performed by the interrupt handling processor further comprise:
    reassigning ports assigned to the interrupt handling processor to the at least one non-interrupt handling processor in response to setting the interrupt throttling state to the first value.

15. The system of claim 13, wherein the interrupt and non-interrupt handling processors further perform:
    processing the scan loop of operations; and
    in response to processing the scan loop of operations, performing:
       determining whether the interrupt throttling state comprises the first value or a second value;
       determining whether the processor processing the scan loop of operations comprises the interrupt handling processor;
       processing interrupts when processing the scan loop of operations in response to determining that the interrupt throttling state has a second value and that the processor processing the scan loop of operations comprises the interrupt handling processor; and
       processing the scan loop of operations without processing interrupts in response to determining that the interrupt throttling state has the second value or that the processor processing the scan loop of operations comprises one of the non-interrupt handling processors.

16. The system of claim 11, wherein the operations further comprise:
 determining that an interrupt has not been received for an interrupt lull time period;
 setting the interrupt throttling state to a second value in response to determining that the interrupt has not been received for the interrupt lull time period; and
 processing interrupts received from the hardware device when processing the scan loop when the interrupt throttling state indicates the second value.

17. The system of claim 11, wherein the operations during the scan loop comprise:
 determining whether the interrupt throttling state indicates the first value, wherein interrupts are processed from the hardware device during the interrupt processing time period in response to determining that the interrupt throttling state indicates the first value, and wherein the determination of whether the number of received interrupts exceeds the interrupt threshold is performed in response to determining that the interrupt throttling state indicates a second value; and
 restarting the interrupt tracking time period in response to determining that the interrupt is received after the interrupt tracking time period has expired.

18. A method for managing interrupts from a hardware device, comprising:
 receiving interrupts from the hardware device;
 determining whether a number of received interrupts exceeds an interrupt threshold during an interrupt tracking time period;
 setting an interrupt throttling state to a first value indicating to only process interrupts during an interrupt processing time period in response to determining that the number of received interrupts exceeds an interrupt threshold;
 processing interrupts from the hardware device during the interrupt processing time period when the interrupt throttling state is set to the first value; and
 masking interrupts received from the hardware device during a processing of a scan loop of operations while the interrupt throttling state has the first value and the interrupt processing time period has expired, wherein the masked interrupts are not processed while processing the scan loop of operations, and wherein further interrupts are not generated until the masked interrupts are handled.

19. The method of claim 18, wherein the method is performed by a processor in a network adaptor having a plurality of ports, wherein the hardware device comprises at least one DMA engine to process I/O requests for the ports and wherein the interrupts comprise error interrupts detected by DMA engine.

20. The method of claim 18, wherein the operations of receiving the interrupts, determining whether the number of interrupts exceeds the interrupt threshold, setting the interrupt throttling state, processing the interrupts during the interrupt processing time period, processing the scan loop of operations, and masking the interrupts are performed by an interrupt handling processor, wherein the scan loop of operations are performed by the interrupt handling processor and at least one non-interrupt handling processor, and wherein the at least one non-interrupt handling processor processes scan loop operations without handling interrupts from the hardware device.

21. The method of claim 20, further comprising:
 reassigning ports assigned to the interrupt handling processor to the at least one non-interrupt handling processor in response to setting the interrupt throttling state to the first value.

22. The method of claim 20, further comprising:
 processing the scan loop of operations;
 in response to processing the scan loop of operations, performing:
  determining whether the interrupt throttling state comprises the first value or a second value;
  determining whether the processor processing the scan loop of operations comprises the interrupt handling processor;
  processing interrupts when processing the scan loop of operations in response to determining that the interrupt throttling state has a second value and that the processor processing the scan loop of operations comprises the interrupt handling processor; and
  processing the scan loop of operations without processing interrupts in response to determining that the interrupt throttling state has the second value or that the processor processing the scan loop of operations comprises one of the non-interrupt handling processors.

23. The method of claim 18, wherein the operations further comprise:
 determining that an interrupt has not been received for an interrupt lull time period;
 setting the interrupt throttling state to a second value in response to determining that the interrupt has not been received for the interrupt lull time period; and
 processing interrupts received from the hardware device when processing the scan loop when the interrupt throttling state indicates the second value.

24. The method of claim 18, wherein the operations during the scan loop comprise:
 determining whether the interrupt throttling state indicates the first value, wherein interrupts are processed from the hardware device during the interrupt processing time period in response to determining that the interrupt throttling state indicates the first value, and wherein the determination of whether the number of received interrupts exceeds the interrupt threshold is performed in response to determining that the interrupt throttling state indicates a second value; and
 restarting the interrupt tracking time period in response to determining that the interrupt is received after the interrupt tracking time period has expired.

\* \* \* \* \*